United States Patent [19]

Day

[11] 3,993,319
[45] Nov. 23, 1976

[54] CHECK WRITING DESK FOR SHOPPING CARTS

[76] Inventor: Guy C. Day, 203 Pine St., Sweetwater, Tex. 79556

[22] Filed: Oct. 3, 1975

[21] Appl. No.: 619,454

[52] U.S. Cl. .......................... 280/33.99 A; 108/14; 280/47.34; 280/DIG. 4
[51] Int. Cl.² ......................................... B62B 3/02
[58] Field of Search ............ 280/33.99 A, 33.99 R, 280/33.99 H, 33.99 B, 33.99 F, DIG. 4, DIG. 3, 47.25, 47.26, 47.34; 40/308; 108/119, 124, 14, 16, 159

[56] References Cited
UNITED STATES PATENTS

| | | | |
|---|---|---|---|
| 2,888,761 | 6/1959 | Miller | 280/33.99 A |
| 2,895,243 | 7/1959 | Hummer et al. | 280/33.99 A |
| 2,998,978 | 9/1961 | Sides | 280/33.99 B |
| 3,218,748 | 1/1965 | Hopp | 40/308 |
| 3,251,543 | 5/1966 | Bush et al. | 280/33.99 A |
| 3,782,747 | 1/1974 | Hamilton, Jr. | 280/33.99 A |
| 3,912,291 | 10/1975 | Frisch | 280/33.99 A |

FOREIGN PATENTS OR APPLICATIONS

| | | | |
|---|---|---|---|
| 1,383,543 | 2/1975 | United Kingdom | 280/33.99 A |

*Primary Examiner*—Robert R. Song
*Assistant Examiner*—David M. Mitchell
*Attorney, Agent, or Firm*—Clarence A. O'Brien; Harvey B. Jacobson

[57] ABSTRACT

A check writing desk, for use on a shopping cart, has integral flanges projecting along one edge of said desk, the projections being bendable around the upper bar of a shopping cart movable partition structure so that the desk may be collapsed flat against the shopping cart structure or flipped over to form a horizontal writing desk in front of a person pushing the cart.

6 Claims, 3 Drawing Figures

CHECK WRITING DESK FOR SHOPPING CARTS

BACKGROUND OF THE INVENTION

1. Field of the Invention

This invention relates generally to a desk attachment for shopping carts. More particularly it concerns a check writing desk which is attachable to the conventional type shopping cart so that a customer may prepare and write out a check in advance of passing through the conventional checkout counter.

2. Description of the Prior Art

A common problem in shopping at stores such as groceries, supermarkets, food markets, meat markets, etc. using shopping carts of the well known type, is for the customer to arrive at the checkout counter, have his items listed by the checker on the cash register, and then only after receiving a total sum of his purchase, pull out his check book and fill in same. This is an inconvenience to all the shoppers waiting in line behind the customer, and in the course of a day's time, much time is wasted by both customers and clerks. If checks were prepared in advance much of this wasted time could be saved.

A number of attachments for shopping carts are known in the prior art such as infant carriers for attachment to shopping carts as taught by the patent to Umanoff, U.S. Pat. No. 2,997,311, and Sprague, U.S. Pat. No. 3,351,380. The use of a directory on a shopping cart is also known as taught by Miller, U.S. Pat. No. 2,888,761 and advertising displays such as taught by Hamilton, Jr., U.S. Pat. No. 3,782,747. U.S. Pat. No. 2,514,735 also shows a foldable tray-table unit, which may be pertinent to this invention. However, none of these prior art patents teaches the unique features of the invention disclosed herein.

SUMMARY OF THE INVENTION

An object of this invention is to provide a convenient check writing desk for use with a conventional shopping cart.

Another object of this invention is to provide a check writing desk which folds compactly against the vertical portions of the shopping cart when the device is not in use and opens easily to a horizontal position to put the device into use.

A further object of this invention is to provide ready means for encouraging a shopper to write out his check in advance of passing through a checkout counter.

A very common problem in the shopping markets today is for a customer to buy a quantity of merchandise and then wait until he is completely checked out before taking his check book out of his pocket, and/or pocketbook, and then preparing same for payment of the merchandise. If customers can be encouraged to prepare their checks in advance a large amount of time can be saved. This is of benefit to all the customers as well as the store itself. Several minutes saved per customer in the course of a day's operation with hundreds of customers amounts to a substantial amount of saved time.

The purpose of this invention is to both motivate the customer to prepare the check in advance and also to provide a readily usable desk for the writing of a check on same.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
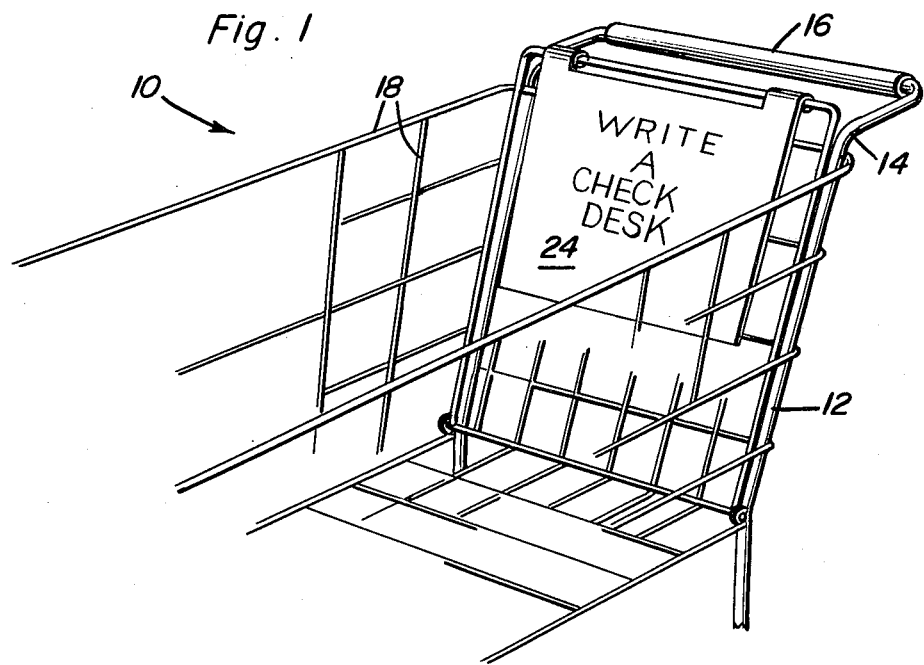
FIG. 1 is a perspective view of the check writing desk in a collapsed position as mounted on a conventional shopping cart.

In FIG. 1 reference numeral 10 refers to the shopping cart with collapsed writing desk in combination. As can be seen by viewing all of the figures a conventional shopping cart is partly shown which has vertical side frame members 12 being bent at the top 14 to form a short horizontal portion for a handle member 16. As is conventional, wheels 13 are provided at the bottom of said cart and horizontal members 15 form a rigid structure for said wheels. A heavy wire enclosure or basket structure is provided by wire grid 18 in a well-known manner. Most of the shopping carts of the type described above have a swingable separator portion 20 which is pivoted at the bottom lower corner of the main basket at points 21. In use it is common practice for this separator to be swung into the open position so that another bottom tray 19 will form a receptacle in the upper rear portion of the main basket for holding small items such as toothpaste, small individual candies, etc. The structure described so far is conventional and well known and is the structure with which the invention of a check writing desk is used.

Figure 2:
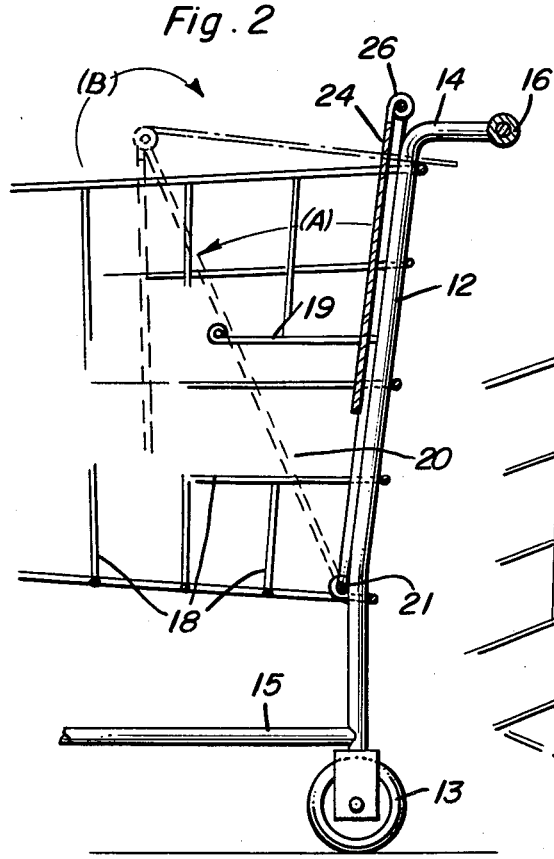
FIG. 2 is a side elevation showing a cart incorporating the invention.

The check writing desk of this invention consists of a flat rectangular member 24 made of metal, plastic, or other suitable material which has a smooth exterior surface and yet is strong and hard for rigidly supporting items to be written upon. At one of the edges along the long side of the rectangle are provided flanges 26. As can best be seen in FIGS. 2 and 3 these flanges are wrapped around the upper horizontal wire or bar 22 of the foldable unit 20. Thus when the member 20 is collapsed against the back vertical edge of the cart basket the check writing desk will hang substantially as shown in solid lines in FIG. 2. And as also best seen in FIG. 2 when the member 20 is swung to the left to the open position as shown by arrow (A) the check writing desk will be hanging in a loose swinging condition as seen in dotted lines in FIG. 2. At this point the user of the cart may flip the desk around the pivoted hinges formed by flanges 26 and bar 22 and as shown by arrow (B) in FIG. 2 to the substantially horizontal desk writing position.

Figure 3:
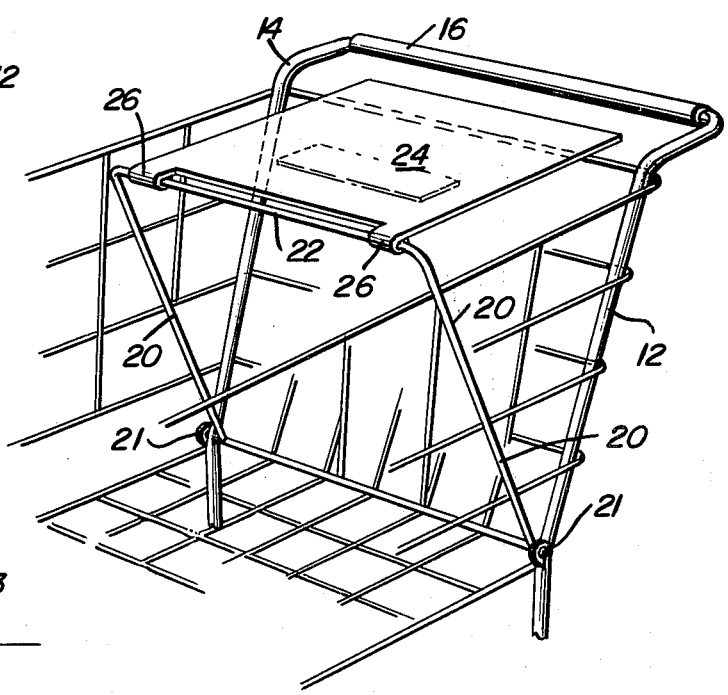
FIG. 3 is another perspective view similar to FIG. 1 showing the desk open ready for use.

FIG. 3 shows the check writing desk in position for use by the cart operator and it is obvious that checks placed upon the desk are in proper position for easy filling in of same.

Another important feature is to provide an appropriate message on one or both sides of the check writing desk to encourage the cart users to prepare their checks in advance. An appropriate message for printing on the checkout desk would be as follows: "Keep checkout line moving, have check made out, except the amount." This or similar messages may be provided on the check writing desk so that the use of the desk will be self-apparent and the operator of the cart will be motivated to so use it.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a shopping cart usable in markets and having a frame, wheels supporting the frame, a handle at one end of the frame, and article receptacle means carried by the frame and defined by generally horizontal and upright rod structure to form with the frame a rectangular enclosed basket structure with the top of the basket structure and the handle being at about the same height above the wheels, additional upright and horizontal rod structure forming a separate pivotable vertical partition member inside of and at the end of the basket structure where the handle is located, the pivotable partition member having an uppermost horizontal rod at a slightly higher height than the top of the basket structure, the improvement comprising means for enabling a user of the cart to conveniently write a check at basket top height including a check writing desk member pivotally mounted by pivot means on the uppermost horizontal rod of said pivotable shopping cart partition member for permitting the desk member to be collapsed in a substantially vertical position when the partition member is pivoted to a closed position at the rear of the basket structure and swung to an open substantially horizontal position between the pivot means and the rear top of the basket structure when the partition member is pivoted to an open position within the basket structure for use as a check writing desk.

2. The device of claim 1 wherein the means for pivotally mounting the desk member comprise at least one flange curled around the horizontal rod to form a pivotable hinge therewith.

3. The device of claim 2 wherein two of said flanges are provided and the desk member and flanges are made of metal.

4. The device of claim 2 wherein two of said flange pivot members are provided and the desk member is made of plastic.

5. The device of claim 2 wherein a message is permanently provided on said desk to instruct and motivate the user of the shopping cart to use the desk to prepare a check in advance of checkout.

6. The device of claim 2 wherein the desk member comprises a flat, rectangular member with the flange of the pivotal means along one of the shorter edges thereof, and instructional directions provided on at least one side of the member.

* * * * *